United States Patent [19]

Constable

[11] Patent Number: 4,694,355
[45] Date of Patent: Sep. 15, 1987

[54] BLACK AND WHITE LEVEL ADJUSTMENT AND NORMALIZATION CIRCUIT FOR A COLOR VIDEO PRINTER

[75] Inventor: Douglas W. Constable, Rochester, N.Y.

[73] Assignee: Eastman Kodak Company, Rochester, N.Y.

[21] Appl. No.: 776,231

[22] Filed: Sep. 16, 1985

[51] Int. Cl.[4] .......................... H04N 5/84; H04N 9/81
[52] U.S. Cl. .................................... 358/332; 358/244; 358/76; 358/80
[58] Field of Search .................. 358/244, 244.1, 244.2, 358/332, 76, 77, 78, 79, 80, 345, 170, 168, 169

[56] References Cited

U.S. PATENT DOCUMENTS

| | | | |
|---|---|---|---|
| 4,219,841 | 8/1980 | Nishimura et al. | 358/29 |
| 4,335,397 | 6/1982 | Tamura | 358/29 |
| 4,339,769 | 7/1982 | Fujita et al. | 358/244 |
| 4,373,156 | 2/1983 | Pfannkuch et al. | 358/332 |
| 4,410,908 | 10/1983 | Belmares-Sarabia et al. | 358/30 |
| 4,459,616 | 7/1984 | Lemke | 358/244 |
| 4,477,831 | 10/1984 | Hosoya | 358/27 |
| 4,488,244 | 12/1984 | Freeman | 358/244 |
| 4,500,919 | 2/1985 | Schreiber | 358/78 |
| 4,530,011 | 7/1985 | Haddick | 358/244 |

OTHER PUBLICATIONS

Philips Report No. EJV 8301 for the TDA 3563 NTSC Demodulator Single Chip Decoder.

Primary Examiner—Raymond F. Cardillo
Assistant Examiner—Robert A. Weinhardt
Attorney, Agent, or Firm—William F. Noval

[57] ABSTRACT

A color video printer for producing a color photographic copy from a color video signal. A self-processing color photographic element is exposed to a sequence of six color field images constituting a full frame of a color video image. The printer includes a monochrome cathode-ray-tube (CRT) and a rotatable color filter having red (R), green (G) and blue (B) filters which are sequentially moved into an optical path between the CRT and the self-processing photographic element positioned at an exposure station. A video signal circuit provides a color video signal to be copied. The color video signal includes luminance and chrominance signals which are demodulated to concurrent R, G, and B component signals. The luminance signal is amplified by a variable gain amplifier which reduces the level of the luminance signal in response to detection of the level of one of the color component signals exceeding a predetermined limit. A gate is selectively actuated to apply one of the color component signals to the CRT. Operator adjustable controls are provided for adjusting the black and white limits of the color component signal applied to the CRT.

3 Claims, 7 Drawing Figures

BLACK AND WHITE LEVEL ADJUSTMENT AND NORMALIZATION CIRCUIT FOR A COLOR VIDEO PRINTER

CROSS-REFERENCE TO RELATED APPLICATIONS

U.S. patent application Ser. No. 776,234 entitled MICROPROCESSOR CONTROL FOR A COLOR VIDEO PRINTER, by Harold J. Barrett, filed Sept. 16, 1985; U.S. patent application Ser. No. 776,233, entitled COLOR VIEWER FOR A COLOR VIDEO PRINTER, by Dana W. Wolcott, filed Sept. 16, 1985; U.S. patent application Ser. No. 776,236, entitled WHITE COMPENSATION CIRCUIT FOR A COLOR VIDEO PRINTER, by Douglas W. Constable, filed Sept. 16, 1985; and U.S. patent application Ser. No. 776,232, entitled COLOR VIDEO PRINTER, by Dana W. Wolcott, filed Sept. 16, 1985.

BACKGROUND OF THE INVENTION

This invention relates, in general, to color video printer apparatus for producing a color photographic copy from a color video signal. More particularly, this invention relates to color video printer apparatus in which a color photographic copy is produced from a sequence of color field images which are normalized to have similar levels of black and white and in which the black and white levels of the exposed copy may be adjusted to the operator's preference.

Several techniques have been proposed for making a color copy from a color video signal. Most of these techniques have drawbacks. Where a still color camera is used to photograph an image displayed on a color monitor, a poor quality copy may result due to difficulties in positioning the camera relative to the monitor and in synchronizing the exposure time with the field or frame rate of the video signal. In another technique, the color video signal is divided into a sequence of red, green and blue signals which are sequentially displayed on a monochrome CRT. Color film is exposed to several frames of each color component image displayed on the CRT through stationary filters corresponding in color to the component signal. This technique is time consuming and not readily applicable to the copying of a moving video scene. Other video printing techniques are disadvantageous due to physical size, due to structural and circuit complexity, due to high cost and/or due to the necessity of replenishing toxic chemicals or handling messy thermal transfer material. Although in many of these techniques, it is possible to adjust the image characteristics of the final copy, such adjustments have been effected by expensive or complex controls using digital processing circuitry or the like.

In commonly-assigned, copending U.S. application Ser. No. 776,232, entitled COLOR VIDEO PRINTER, there is disclosed a color video printer which obviates those disadvantages by providing a compact, economical and easy to use color video printer which produces a full resolution color copy of a color video signal with short exposure and processing time. As disclosed, the color video printer includes a monochrome display device and a color filter having first, second and third primary color filters sequentially movable into an optical path between the display device and a self-processing photographic element positioned at an exposure station. A video signal circuit applies a sequence of primary color component signals to the display device as corresponding color filters move into the optical path to expose the element to a sequence of six color field images constituting a full resolution color image. A composite color video signal having luminance and chrominance components is demodulated into three concurrent primary color component signals from which one component signal is selected by a sequential gate for application to the display device.

In such a color video printer, it is desirable that the printer operator be able to adjust the black and white levels in a finished print to suit individual aesthetic tastes by using a simple and inexpensive control technique. At the same time, since the copy is produced from a sequence of field images, it is also desirable that the black and white levels of each field be normalized with respect to each other to effect consistent image characteristics from field to field.

SUMMARY OF THE INVENTION

According to the present invention, there is provided a color video printer which produces a color photographic copy from a color video signal in which the black and white levels of the copy reflect the aesthetic tastes of the printer operator. This is effected in a simple and inexpensive manner by means of operator adjustable black and white level controls. These controls set the black and white level of color component signals sequentially applied to a monochrome display device. The display device converts the color component signals into a sequence of monochrome images which are filtered by corresponding color filters to expose a photographic element to a series of color field images.

According to another feature of the present invention, the black to white range of each sequential color component signal applied to the monochrome display device is normalized from field to field to effect consistency between the six field images used to expose the photographic element. A composite color video signal is separated into luminance and chrominance signals which are demodulated into three concurrent primary color component signals. If the white level of any of the component signals exceeds a predetermined value, a variable gain amplifier for the luminance signal effects a reduction in the amplification of the luminance signal to reduce the white level of the excessive color component signal. Thus, the sequence of fields of color component signals applied to the display device will have a consistent black to white range of signal values from field to field. This results in high image quality of the color copy.

DESCRIPTION OF THE DRAWINGS

In the detailed description of the invention presented below, reference is made to the accompanying drawings in which like elements are numbered with like numbers.

DESCRIPTION OF THE PREFERRED EMBODIMENT

In the following description of an illustrative color video printer incorporating the present invention, the printer will be described with respect to the processing of an NTSC color video signal which is the standard broadcast signal in the United States, Canada, Japan and other countries. It will be understood that the illustrative printer may also be used with other broadcast standards such as the PAL and SECAM systems used in Europe and other parts of the world. In the NTSC system, a single color image is represented by a color video signal constituting a frame of two interlaced odd and even fields. Each color field signal includes luminance and chrominance component signals (red, green and blue). The color video signal is broadcast at 30 frames or 60 fields per second.

Figure 1:
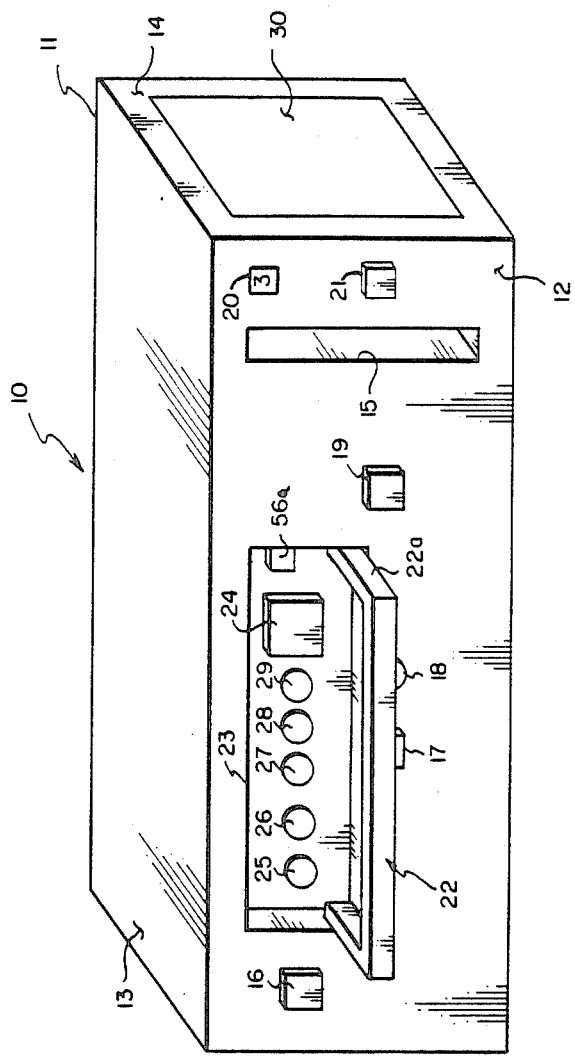
FIG. 1 is a perspective view of a color video printer including the video signal processing circuit according to the present invention.

Referring now to the figures, there is shown an illustrative color video printer incorporating a preferred embodiment of the present invention. In FIG. 1, printer 10 includes a housing 11 having a front panel 12, a top panel 13, and a side panel 14 with a door 30 for inserting packs of self-processing photographic elements into printer 10. Not shown are another side panel, a bottom panel and a rear panel. Front panel 12 includes a print ejection slot 15, a "POWER" switch 16, a "PRINT" switch 17, a "READY" light 18, an "NTSC/RGB" switch 19, an "EXPOSURE NUMBER" dial 20 and a latch 21 for door 30. A cover 22 with lip 22a is mounted on panel 12 and is movable between an open position (as shown in FIG. 1) and a closed position. When cover 22 is in the open position, a recessed panel 23 is accessible to an operator for viewing and adjusting an image. Panel 23 includes an image viewer 24 and adjustable operator controls 25, 26, 27, 28 and 29 for varying the image characteristics of an image to be copied. As will be explained later, controls 28 and 29 adjust the black and white levels respectively of such an image.

Figure 2:
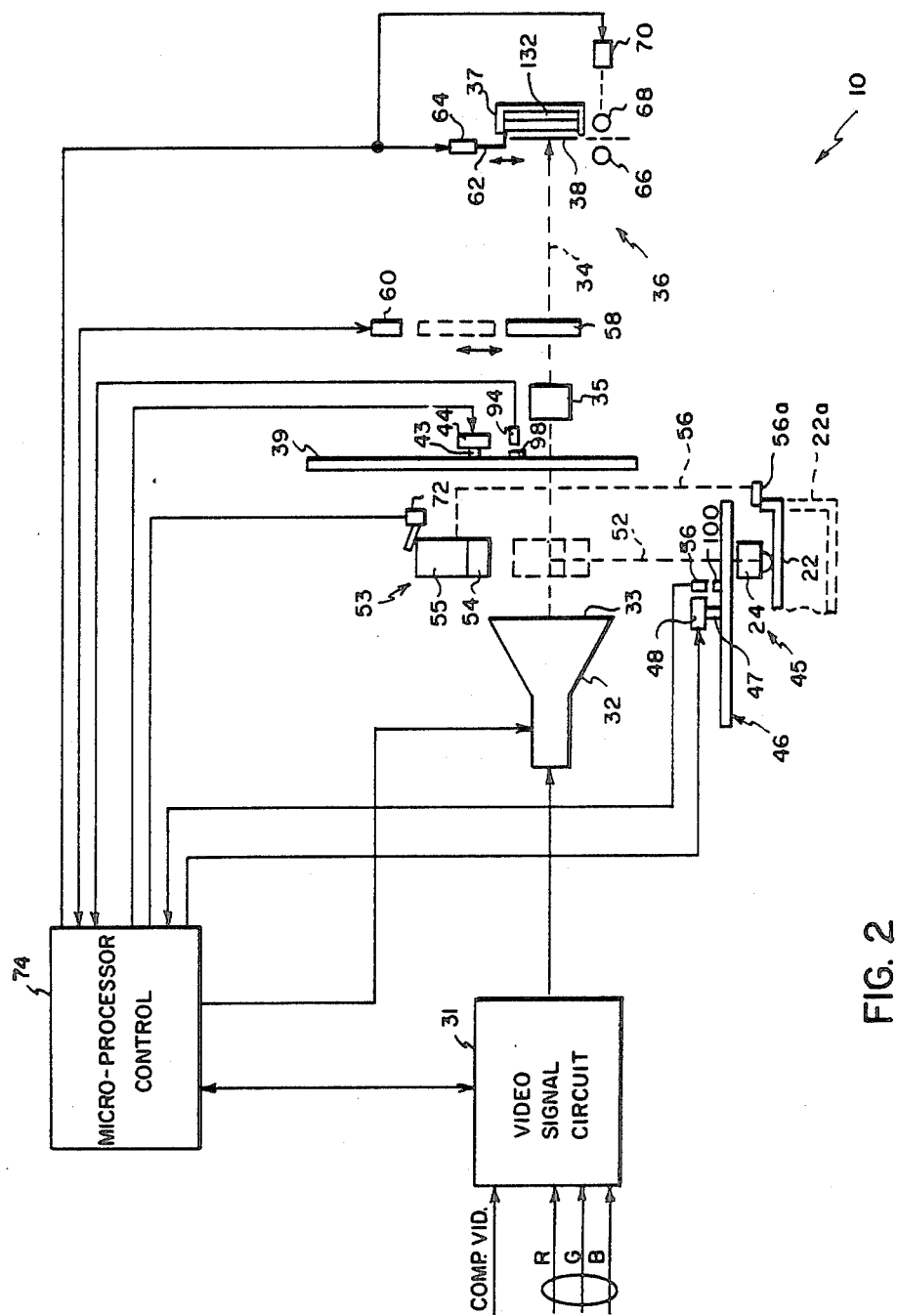
FIG. 2 is a partially schematic, partially diagrammatic view of the printer of FIG. 1.

Referring now to FIG. 2, there is shown a partially schematic, partially diagrammatic view of important components of printer 10. As shown, printer 10 includes a video signal circuit 31 which receives (by actuation of switch 19 on panel 12 in FIG. 1) either a composite color video signal having luminance and chrominance component video signals or an RGB component color video signal having three concurrent primary color signals constituting red (R), green (G), and blue (B) component video signals. The composite color video signal is illustratively described as being in the NTSC format which has a field frequency of sixty fields per second, or a frame frequency of thirty frames per second. The color video signal may be provided by a transmission source, such as broadcast, cable or satellite transmission; by a recording device such as a video cassette recorder/player, a magnetic disc player or an optical disc player; or by a program source such as a video camera.

As will be explained in greater detail with respect to FIG. 3, video signal circuit 31 processes either a composite color video signal or an RGB component color video signal to provide a repetitive sequence of RGB primary color component video signals to a monochrome electronic display device such as a monochrome cathode ray tube (CRT) 32. The applied video signal is converted to a monochrome optical image which is displayed on the screen 33 of CRT 32. An exposure station 36 is located along a first (exposure) optical path 34 from CRT 32. Positioned at station 36 is a pack 37 of unexposed self-processing photographic elements 38.

Figure 6A:
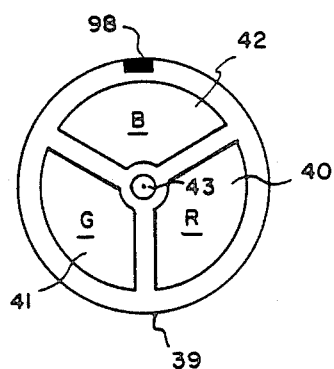
FIGS. 6A and 6B are frontal views respectively of the exposure and viewer filter wheels shown in FIG. 2.

A first (exposure) color filter wheel 39 has (see FIG. 6A) a red filter 40, a green filter 41, and a blue filter 42. Filter wheel 39 is mounted for rotation on shaft 43 and is driven by a motor 44 to sequentially move filters 40, 41 and 42 into optical path 34 in synchronism with the field frequency of the color video signal. Monochrome images displayed on screen 33 of CRT 32 are filtered by filters 40, 41 and 42 to produce color images projected to station 36 by projection lens 35.

Figure 6B:
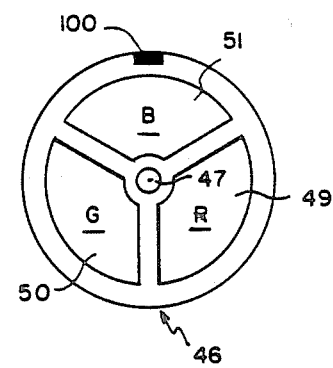

Printer 10 also has a viewing station 45 at which an operator may view an image prior to making a print. Viewing station 45 includes a second (viewer) filter wheel 46 mounted on shaft 47 and driven by motor 48. Filter wheel 46 is similar in construction to filter wheel 39 and includes respective red, green and blue filters 49, 50 and 51 (see FIG. 6B) which are sequentially movable into a second (viewer) optical path 52 from CRT 32 to viewer 24. A mirror assembly 53, which includes mirrors 54 and 55, is movable between a position (as shown in solid lines in FIG. 2) which is out of the exposure optical path 34 and a position (as shown in dashed lines in FIG. 2) intercepting optical path 34 and establishing viewer optical path 52. As noted above, cover 22 is movable between a closed position (as shown in solid lines in FIG. 2) in which the viewer 24 is covered, and an open position (as shown in dashed lines in FIG. 2), in which the viewer 24 is uncovered so that an image displayed on CRT 32 may be viewed by an operator. When cover 22 is opened, mirror assembly 53 is moved by coupling 56 into optical path 34. When cover 22 is closed, lip 22a of cover 22 contacts finger 56a of coupling 56 to move mirror assembly 53 out of optical path 34 to permit printing of the image produced by CRT 32. The construction and operation of coupling 56 and optical assembly 53 is described in greater detail in cross-referenced, copending U.S. patent application Ser. No. 776,233, entitled COLOR VIEWER FOR A COLOR VIDEO PRINTER.

Printer 10 includes a shutter 58 movable into and out of optical path 34 by means of solenoid 60. A print eject assembly includes a pusher arm 62 actuated by a solenoid 64 and a pair of processing and eject rollers 66 and 68 rotatably actuated by motor 70.

Printer 10 also includes a detector 73 for detecting when assembly 53 is out of path 34 (which indicates cover 22 is closed).

Figure 3:
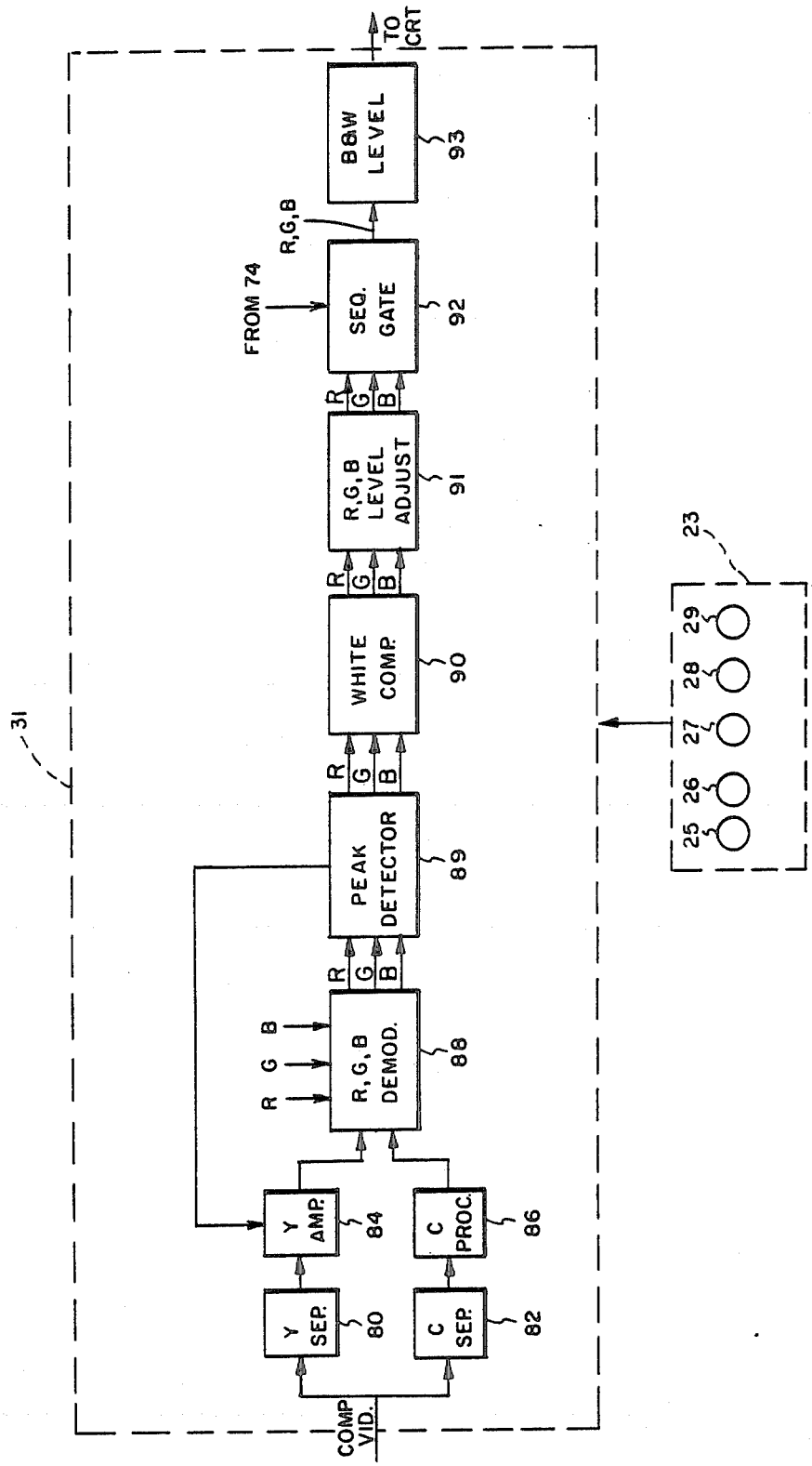
FIG. 3 is a block diagram showing in greater detail the video signal circuit shown in FIG. 2.

Video signal circuit 31 according to the present invention is shown in greater detail in FIG. 3. As shown, a composite color video signal is applied to luminance separation circuit (Y SEP) 80 and chrominance separation circuit (C SEP) 82 which separate the luminance (Y) and chrominance (C) component signals from the composite video signal. The luminance signal is amplified by a variable gain amplifier (Y AMP) 84 and the chrominance signal is amplified and processed by a chrominance processing circuit (C PROC) 86. The processed luminance and chrominance signals Y and C are applied to a demodulation and amplifier circuit (RGB DEMOD) 88 which demodulates the Y and C signals into concurrent red (R), green (G) and blue (B) component signals which are amplified. As explained above, printer 10 is also capable of processing a color video signal including concurrent R, G, and B component signals. In such case, the R, G, B, signals are applied directly to RGB DEMOD circuit 88 which only amplifies the color component signals.

According to an aspect of the present invention, the R, G, B component signals are applied to a PEAK DETECTOR circuit 89 which detects whether the white level of any of the color component signals exceeds a predetermined maximum white level. If any signal exceeds this maximum level circuit 89 clips such a signal to the maximum level and causes circuit 84 to reduce the gain of the luminance component signal thereby reducing the excessive color component signal to a proper level. By effecting such peak white limiting in each successive field, the black to white range of each color component signal is normalized from field to field to effect consistent black and white characteristics of each field image to which a photographic element 38 is exposed.

Circuits 84, 86, 88 and 89 may be combined into a single integrated circuit chip such as the 28 pin single chip decoder "ICTDA 3563" supplied by N.V. Philips Gloeilampen-fabrienken, Eindhoven, The Netherlands.

The normalized R, G, B component signals are applied to WHITE COMP circuit 90 which boosts the component signals in the maximum white signal region to compensate for the relative insensitivity in the white region of the exposure characteristics of the self-processing photographic element 38. The maximum levels of the R, G, B component signals are adjustable in RGB LEVEL ADJ circuit 91 to permit balancing of these signals relative to the characteristics of CRT 32. A more detailed description of a preferred white compensation circuit is given in cross-referenced, copending U.S. patent application Ser. No. 776,236, entitled WHITE COMPENSATION CIRCUIT FOR A COLOR VIDEO PRINTER.

The R, G, B component signals from circuit 91 are applied concurrently to SEQUENTIAL GATE 92. As will be described later, gate 92 is controlled by microprocessor control 74 to select one of the three concurrent R, G, B component signals and apply to it to CRT 32 through B & W LEVEL ADJUST circuit 93. Circuit 93 includes the black level control 28 and the white level control 29 on subpanel 23 shown in FIG. 1. Control 25 controls the detail of the video signal and controls 26 and 27 respectively control the color saturation and hue of the chrominance signal processed by circuit 86.

Figure 5:
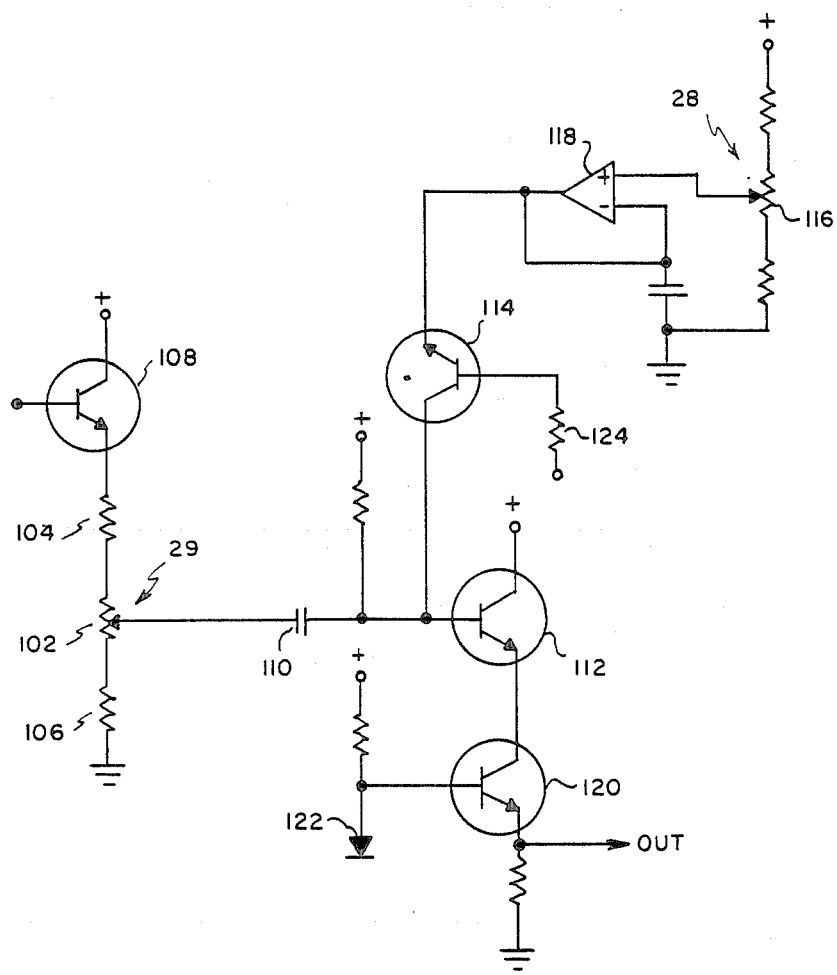
FIG. 5 is a schematic diagram of the black and white level adjust circuit of FIG. 3.

Circuit 93 is shown in greater detail in FIG. 5. White level control 29 includes a variable resistor 102 connected in series with resistors 104 and 106 and the emitter of buffer transistor 108. The output of gate 92 is connected to the base of transistor 108. The wiper arm of variable resistor 102 is coupled through capacitor 110 to the base of transistor 112 and to the collector of transistor 114. The black level control 28 includes a variable resistor 116, the wiper arm of which is coupled through buffer amplifier 118 to the emitter of transistor 114. The output of circuit 93 is taken from the emitter of transistor 120. a vertical blanking signal is applied to the base of transistor 120 through diode 122 and a black clamp signal applied to the base of transistor 114 through resistor 124.

By adjusting controls 28 and 29 respectively, the black and white levels of the color component signal applied to CRT 32 may be adjusted independently of the color component signal selected by gate 92. Adjustement of the black and white levels of the exposed copy may thus be effected by the printer operator according to one's taste.

Operation of the printer 10 by means of microprocessor control 74 will now be described. The cross-referenced, copending U.S. patent application Ser. No. 776,234, entitled MICROPROCESSOR CONTROL FOR A COLOR VIDEO PRINTER should be referred to for a more detailed description of such operation. Actuation of switch 16 (FIG. 1) on front panel 12 turns printer 10 on causing filter wheel motors 44 and 48 to rotate filter wheels 39 and 46, respectively. The rotational speed of wheels 39 and 46 is synchronized with the field frequency of the color video signal processed by printer 10. Since the illustrative NTSC field frequency is sixty fields per second (fps) and filter wheels 39 and 46 have three color filters, each of wheels 39 and 46 are rotated at twenty revolutions per second.

Control 74 provides a turn-on delay to permit CRT 32 to warm up. After the CRT 32 is warmed up, a "READY" light 18 on panel 12 (FIG. 1) is turned on indicating to the operator that printer 10 is ready to make a photographic copy of a color video signal. In addition to warm-up, the ready light requires synchronization of color wheels with an input TV signal.

If a copy of a video signal is to be made without any adjustments to the image characteristics thereof (such as black, white, detail, color and hue levels), the operator actuates "PRINT" switch 17 on control panel 12. Upon initiation of the "print" operation, control 74 actuates solenoid 60 to move shutter 58 out of exposure optical path 34. When the mark 98 on filter wheel 39 has been detected by detector 94 to confirm that red filter 40 (FIG. 5) of filter wheel 39 intercepts optical path 34, control 74 turns CRT 32 on and causes video signal circuit 31 to apply a red component video signal to CRT 32. CRT 32 converts the video signal to a monochrome optical image on screen 33 which is converted to a red optical image by red filter 40 (FIG. 5A). The red optical image is projected along path 34 by lens 35 to exposure station 36 to expose a self-processing photographic element 38 positioned at station 36. As filter wheel 39 continues to rotate to sequentially move green filter 41 and blue filter 42 into optical path 34, control 74 causes circuit 31 to sequentially apply corresponding green and blue component video fields to CRT 32. This sequence is repeated for another sequence of red, green and blue fields. Thus, a photographic element 38 is exposed to a full resolution frame of a color video signal with six color field images in the sequence of red, green, blue, red, green, blue field images.

Figure 4:
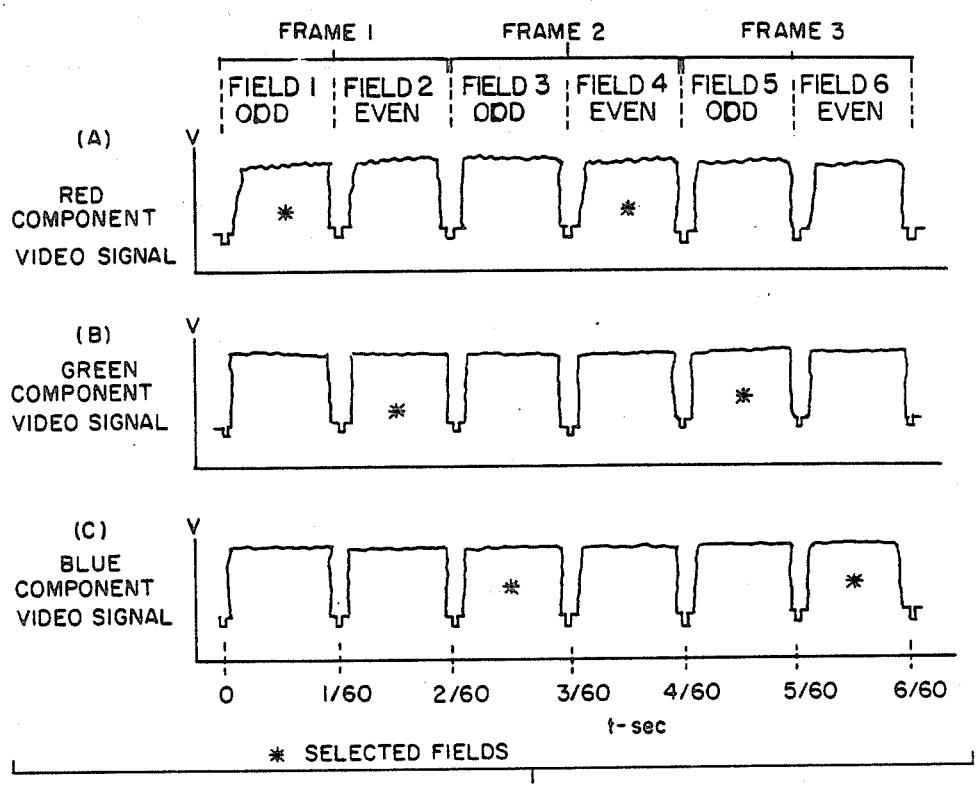
FIGS. 4A, 4B and 4C are respective video signal diagrams illustrating the operation of the printer shown in the Figures.

The sequence of exposure of element 32 is illustrated in FIG. 4. As shown, concurrent red (R), green (G), and blue (B) component video signals are applied by circuit 91 (FIG. 3) to gate 92 for a duration of three frames or six fields of color video signals. Each frame includes interlaced odd and even fields. Microprocessor control 74 is programmed to actuate gate 92 to select only one color component signal from each field of three concurrent color component signals for application to CRT 32. In FIG. 4, the selected color component signal is indicated by "*". Thus, in Field 1, the "odd" red component video signal is selected; in Field 2, the "even" green component video signal is selected, in Field 3, the "odd" blue component video signal is selected; in Field 4, the "even" red component video signal is selected, in Field 5, the "odd" green component video signal is selected; and in Field 6, the "even" blue component video signal is selected. Thus, self-processing photographic element 38 is exposed to a full resolution frame of a color video image having odd and even fields of each of red, green and blue primary colors. The exposure time of element 10 is relatively short-1/10 sec. Where the incoming color video signal represents a relatively static subject in a moving video scene, the resolution of the photographic copy is suprisingly high due to the short exposure time. Printer 10 may thus be used to make copies of color video images of relatively static moving scenes.

After exposure of element 38, control 74 turns off CRT 32 and actuates solenoid 60 to close shutter 58. Photographic element 38 is ejected from exposure station 36 by actuation of solenoid 64 to cause pusher rod 62 to move element 38 out of pack 37 into the nip of rollers 66 and 68 (dashed lines in FIG. 2) which are rotated by motor 70. As element 38 is moved through this nip, rollers 66, 68 rupture a pod of processing chemicals made integral with element 38 and spread the chemicals uniformly over the exposed image-forming area of element 38. Element 38 self-processes to a finished photographic print outside of printer 10. A particularly exemplary photographic element which may be used in printer 10 is the "Trimprint" ® instant film pack sold by the Eastman Kodak Company, Rochester, N.Y.

After ejection of an exposed self-processing photographic element from exposure station through slot 15 in panel 12 (FIG. 1), printer 10 is ready to make another copy. Spring 132 of pack 37 urges an unexposed photographic element 38 into exposure station 36.

If the operator desires to make adjustments to the characteristics of the color image to be copied, he/she opens cover 22 to gain access to viewer 24 and image controls 25-29 (FIG. 1). Optical assembly 53 is moved into optical path 34 by coupling 56 to establish viewing optical path 52 to viewer 24 (FIG. 2). After detecting red filter mark 100 of the viewer filter wheel 46, microprocessor control 74 turns on CRT 32 and actuates gate 92 to gate through to CRT 32, repetitive sequences of red, green and blue component video signals. Since viewer filter wheel 46 is synchronized with the field frequency of the incoming color video signal, the operator views the same color image that a photographic element 38 will be exposed to. By adjusting controls 25-29 on panel 12 (FIG. 1) the operator can change the color, hue, detail, black and white level characteristics of the color video image to be copied.

After the adjustments have been completed or if no adjustments are made, the operator closes cover 22 to move optical assembly 53 out of the exposure optical path 34 and exposure of a photographic element may then be effected.

The invention has been described in detail with particular reference to a preferred embodiment thereof, but it will be understood that variations and modifications can be effected within the spirit and scope of the invention.

What is claimed is:

1. In a color video printer apparatus for producing a color photographic copy from a color video signal, said apparatus including a monochrome electronic display means for displaying an image of a video signal; an exposure station located along an optical path from said display means at which is located a color photographic element; and a continuously moving color filter having first, second and third primary color filters sequentially movable into said optical path in synchronism with a field frequency of said color video signal; video signal processing apparatus comprising:
   means for providing a color video signal having a separated chrominance signal and a luminance only signal;
   variable gain amplifying means for amplifying said luminance signal;
   demodulating means for demodulating said amplified luminance signal and said chrominance signal into concurrent first, second and third primary color component signals;
   means for reducing the gain of said amplifier means in response to detection of a value of any one of said color component signals exceeding a predetermined limit so as to reduce a value of said luminance signal and reduce the value of the color component signals by an equal amount;
   gate means for selectively applying to said display means only one of said color component signals from each field of three concurrent color component signals;
   operator adjustable control means for adjusting black and white levels of a color component signal applied by said gate means to said display means; and
   means for actuating said gate means, in response to movement of said first primary color filter into said optical path, to apply to said display means a consecutive sequence of six color component video signals consituting odd and even fields of each of said first, second and third primary colors, said sequence starting with said first primary color component signal, as respective corresponding color filters are moved into said optical path, such that said display means produces a sequence of six monochrome images which are filtered by said respective corresponding color filters to expose a color photographic element at said exposure station to a sequence of six consecutive color field images constituting a full frame of a color video image, wherein each of said sequential fields has been normalized to have similar levels of black and white and wherein the black and white levels in an exposed photographic element may be adjusted to the tastes of a printer operator through adjustment of the black and white levels of said color component signals.

2. The video signal processing apparatus of claim 1 wherein said video signal providing means includes means for separating a composite color video signal into said luminance and chrominace signals.

3. The video signal processing apparatus of claim 1 wherein said demodulating means demodulates said luminance and chrominance signals into concurrent red, green and blue component signals and wherein said gain reducing means includes means for detecting when the value of any one of said red, green and blue component signals exceeds said predetermined limit, and means for applying a gain reduction signal to said amplifying means in response to such detection.

* * * * *